March 11, 1941.  J. T. BRUEGGEMAN  2,234,853
SNAP HOOK
Filed April 24, 1940
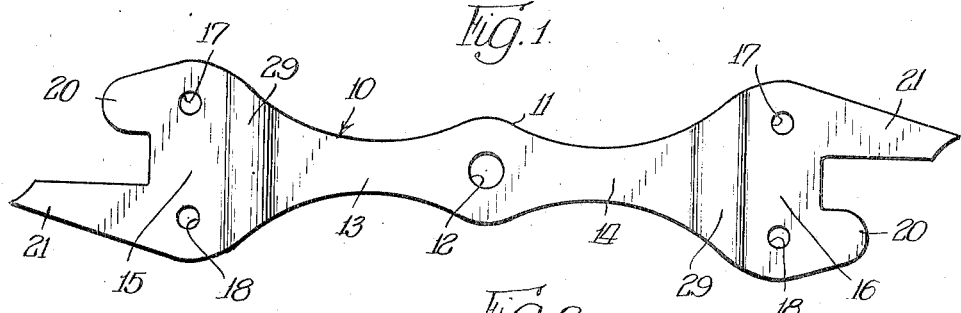
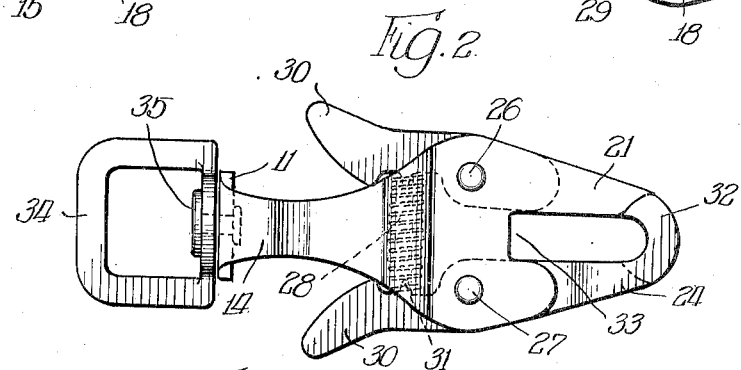
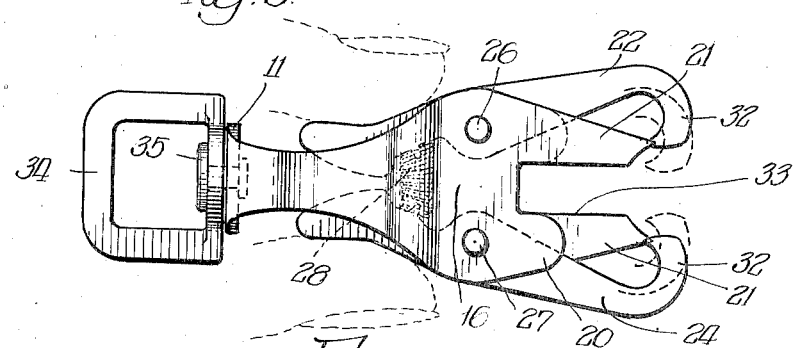
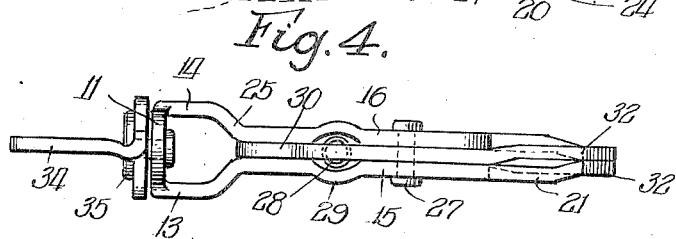
INVENTOR.
John T. Brueggeman,
BY
Wilkinson Huxley Byron & Knight
Attys.

Patented Mar. 11, 1941

2,234,853

UNITED STATES PATENT OFFICE 2,234,853

SNAP HOOK

John T. Brueggeman, Winnetka, Ill.

Application April 24, 1940, Serial No. 331,330

12 Claims. (Cl. 24—234)

The invention relates to improvements in hooks and clasps of the snap-acting type and has reference more particularly to an improved snap hook wherein the ring or other object to be held by the snap hook can be instantly clasped and also released and wherein the moving parts will be adequately strengthened and the coil spring protected from injury of any kind.

Another object of the invention is to provide a snap-acting hook as described which will be positive in operation, having frame members constructed to provide a release guide-channel for the ring or other object to be held and which frame members will also cooperate with the movable hook members to prevent any possibility of the ring becoming entangled in the hook members when fully opened or even when partly opened.

Another object is to provide a snap-acting hook having side frames and a base that can be stamped from a single metal strip and wherein the frames will be formed to provide therebetween a substantially tubular enclosure for accommodating the coil spring which in assembled relation maintains the movable hook members in closed position.

A further object of the invention is to provide a snap hook which will have a swivel connection applied to the base of the one-piece frame member; a snap hook which in its entirety will embody relatively few parts, which can be easily assembled, and which can be economically manufactured in relatively large quantities.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1 is a plan view of the integral stamping comprising the base and side frame pieces of the present snap hook;

Figure 2 is a side elevational view of the completed snap hook embodying the improved features of the invention and showing the hook members in closed position;

Figure 3 is a side elevational view similar to Figure 2 but showing the movable hook members in open position; and Figure 4 is an end view of the present snap hook.

Referring to the drawing, the base and side frame members are formed from an integral metal strip by a stamping operation or the like and which in Figure 1 is identified by numeral 10. The central part 11 of the integral stamping provides the base of the snap hook and since that portion has a swivel connection applied thereto, the same is formed with an opening 12. The stamping is symmetrical with respect to the base portion 11, having the parts 13 and 14 extending in opposite directions from the base 11 and which are somewhat less in width than said base. From each part 13 and 14 the stamping materially increases in width to provide the side frames 15 and 16, each frame having two openings 17 and 18 formed therein for receiving the pivots for the hook members to be presently described. The extremities of each of the side frames 15 and 16 are formed to provide an ear portion 20 and an extension 21, it being observed that with respect to frame 15 the portion 20 is above the extension 21, where as, with respect to frame 16, the parts are just reversed.

For accommodating the movable hook members 22 and 24 the metal stamping is bent so that the side frames are in opposed relation to each other, as best shown in Figure 4. The metal is bent at substantially right angles on each side of the base portion 11 and the parts 13 and 14 are additionally bent adjacent the frames as at 25 to bring the side frames in close relation with each other and so disposed as to be substantially parallel throughout their extent. This bending of the metal stamping is carried out so that the openings 17 and 18 in the side frame 15 will align with the similar openings in the side frame 16. A pin or stud shaft 26 is inserted through aligned openings 17 to provide a pivot for the hook member 22 and which is thereupon securely held by flattening or beading over the projecting ends of the same. In a like manner a pin or stud shaft 27 is inserted through aligned openings 18 to pivotally mount the hook member 24 and the projecting ends of this pin are also flattened in order to securely hold the same in place and the respective side frames in close contacting relation with the hook members although said hook members will be free to have pivoting movement.

The snap hook of the invention makes use of a coil spring 28 for maintaining the hook members in closed position as shown in Figure 2. For accommodating said coil spring each side frame is provided with a bulbous portion 29 on the exposed surface, which forms a recess on the inside surface and a transversely extending channel when the side frames are in associated relation.

The extent of the depression formed in each side frame is determined by the size of the coil spring which must be retained within said frames so as to have freedom of action for yieldingly forcing the hook members 22 and 24 into closed position and to yieldingly oppose any action such as will cause the hook members to open. The rear extremity 30 of each hook member is formed so as to provide a seat for its respective end of the coil spring and said coil spring, as shown in Figure 2, is properly associated with the hook members by the centrally projecting extension 31.

The rear portions 30 of the hook members are maintained in separated relation by the spring 28 and accordingly the hooked ends 32 of the same are yieldingly biased into a closed position. Each end 32 is adapted to have contact with an extension 21, which extension provides an abutment or stop for its respective hook member. The ends 32 of said members have overlapping relation when in closed position, as in Figure 2, and said ends close the channel 33 provided by the frame members. The base of the channel is formed by both frame members, whereas, one side is formed by the extension 21 on the frame 15 and the opposite side thereof is formed by extension 21 on the frame 16. The depth of the channel is determined by the length of the extensions and it will be observed that the same extend as far as possible, leaving only a relatively small curved portion on the hook members for closing said channel.

The guide channel 33 and extensions 21 are constructed as above described in order to facilitate entrance of the ring or other object to be held by the snap hook and to additionally facilitate immediate release of the same. The constructional arrangement of the parts mentioned effectively prevents any possibility of the ring becoming entangled in the hooked ends 32 when an attempt is made to withdraw the ring. There is not sufficient clearance between an extension 21 and the hook member associated therewith when said members are opened to permit the ring or other object to pass between. Maximum support is given to the hook members 22 and 24 in their pivoting movement by the ear portions 20, which accounts for this structural feature.

Since the hook members are mounted between the side frames 15 and 16 it is necessary to bend the upper portion of the members so that their hooked ends will align with their respective extensions 21. The manner of bending is more particularly shown in Figure 4 wherein it will be observed that the end 32 of each member is bent outwardly and the upper portion of each extension 21 is bent inwardly so that the parts coincide at their extremities. It is desirable to have each hook member properly aligned with its respective extension 21 since said extension in addition to providing one side of the guide channel 33 forms the stop or abutment for the hook member contacting therewith.

The base of the present snap hook has suitably secured thereto a square hook or eyelet 34 by which the hook may be suitably secured to a strap such as a dog leash or other element. The swivel connection by which the eyelet 34 is held to the base consists of the rivet 35 which is inserted through the base portion of the eyelet and through the opening 12 in the base 11 of the snap hook. The projecting end thereof is then flattened to securely hold the rivet and prevent release of the same although free rotation of the eyelet 34 on the snap hook is possible.

The invention is not to be limited to or by details of construction of the particular embodiment thereof illustrated by the drawing, as various forms of the device will of course be apparent to those skilled in the art without departing from the spirit of the invention or the scope of the claims.

What is claimed is:

1. In a snap hook, in combination, spaced side frames, members pivotally mounted between the side frames and having curved ends normally overlapping each other, a coil spring confined between the side frames for maintaining the members in closed relation with said curved ends overlapping, and each side frame having an extension along one side edge to form a stop for the curved end of the member opposed thereto whereby to limit movement of said member in a closing direction.

2. In a snap hook, in combination, spaced side frames, a pair of members pivotally mounted between the side frames and each having a curved end normally overlapping the other, a coil spring located transversely between the side frames and confined at its ends between said members for maintaining the members in closed relation with said curved ends overlapping, and each side frame having an extension along one side edge to form a stop for the curved end of the member opposed thereto, whereby to limit movement of said member in a closing direction.

3. In a snap hook, in combination, spaced side frames, a pair of members pivotally mounted between the side frames in opposed relation and each having a curved forward end normally overlapping the other, a coil spring located transversely between the side frames and confined at its ends between the rear portions of said members for maintaining the members in closed relation with said curved ends overlapping, and each side frame having an extension along one side edge to form a stop for the curved end of the member opposed thereto, whereby to limit movement of said member in a closing direction.

4. In a snap hook, the combination with spaced side frames, of a pair of members pivotally mounted therebetween on individual axes adjacent the side edges respectively of said frames, each member having a curved forwardly extending end which overlap each other when in closed relation, the rearward end of each member providing portions to be actuated for opening the said curved ends, a coil spring located transversely between the side frames and confined at its ends between the rear portions of said members to thereby maintain the members in closed relation, and each frame having an extension along one side for contact with the curved end of the member opposed thereto, whereby to form a stop limiting movement of the member in a closing direction.

5. In a snap hook, the combination with spaced side frames each having an extension along opposite side edges, of a pair of members pivotally mounted between the side frames on individual axes adjacent the side edges respectively, each member having a hook-shaped forward end and a flaring rear portion, and a coil spring located transversely between the side frames and confined at its ends between the rear portions of said members, said coil spring serving to maintain the rear portions of the members separated with the hook-shaped ends overlapping and each said end in engagement with the extension disposed opposite thereto, whereby the extensions form a stop limiting closing movement of the members.

6. In a snap hook, the combination with spaced side frames each having an extension along an opposite side edge, a pair of members pivotally mounted between the side frames on individual axes adjacent the side edges respectively, each member having a hook-shaped forward end and a flaring rear portion, a coil spring located transversely between the side frames and confined at its ends between the rear portions of said members, whereby said coil spring serves to maintain the rear portions of the members separated and the hook-shaped ends overlapping in closed relation, and each said extension substantially aligning with the hook-shaped end of its opposed member to form a stop limiting movement of said member in a closing direction.

7. In a snap hook, the combination with spaced side frames each having an extension along an opposite side edge, a pair of members pivotally mounted between the side frames on individual axes adjacent the side edges respectively, each member having a hook-shaped forward end and a flaring rear portion, said side frames being formed to provide a transverse passage therebetween, a coil spring disposed within the passage and between the rear portions of said members for retaining the members closed with the hook-shaped ends in overlapping relation, said flaring rear portions providing means to be actuated for opening the members, and each said extension having alignment with the hook-shaped end of its opposed member to form a stop limiting closing movement of said member.

8. In a snap hook, the combination with spaced side frames formed from an integral metal stamping having a connecting base portion, a pair of members pivotally mounted between the side frames in opposed relation, each member having a hook-shaped forward end and a flaring rear portion, a coil spring disposed transversely between the side frames and confined at its ends between the rear portions of said member for maintaining the rear portions separated and the hook-shaped ends in overlapping relation, and said frames each having an extension along an opposite side edge in substantial alignment with the hook-shaped end of its opposed member, whereby said extensions form a stop limiting movement of the members in a closing direction.

9. In a snap hook, the combination with spaced side frames formed from an integral metal stamping having a connecting base portion, a pair of members pivotally mounted between the side frames in opposed relation, each member having a hook-shaped forward end and a flaring rear portion, a coil spring disposed transversely between the side frames and confined at its ends between the rear portions of said member for maintaining the rear portions separated and the hook-shaped ends in overlapping relation, said frames each having an extension along an opposite side edge in substantial alignment with the hook-shaped end of its opposed member, whereby said extensions form a stop limiting movement of the members in a closing direction, and an eyelet having a swivel connection with said base portion.

10. In a snap hook, the combination with spaced side frames formed from an integral metal stamping having a connecting base portion, each side frame having an extension along one side edge and an ear portion on the opposite side edge, the said extension on one frame being located opposite to the ear portion on the other frame, a pair of members pivotally mounted by said frames in a manner whereby a member will be located between each extension and its opposed ear portion, the forwardly extending end of each member having a curved shape in substantial alignment with the extension opposite thereto, whereby the said extensions form a stop limiting movement of the members in a closing direction, the rearwardly extending ends of each member providing portions to be actuated for opening the said curved ends, and a coil spring located between the side frames and confined at its ends between the said rear portions of the members, whereby said coil spring serves to maintain the rear portions of the member separated and the curved ends in overlapping relation.

11. In a snap hook, the combination with spaced side frames formed from an integral metal stamping having a connecting base portion, each side frame having an extension along one side edge and an ear portion on the opposite side edge, the said extension on one frame being located opposite to the ear portion on the other frame, a pair of members pivotally mounted by said frames in a manner whereby a member will be located between each extension and its opposed ear portion, the forwardly extending end of each member having a curved shape in substantial alignment with the extension opposite thereto, whereby the said extensions form a stop limiting movement of the members in a closing direction, the rearwardly extending ends of each member providing portions to be actuated for opening the said curved ends, a coil spring located between the side frames and confined at its ends between the said rear portions of the members, whereby said coil spring serves to maintain the rear portions of the member separated and the curved ends in overlapping relation, and an eyelet having a swivel connection with said base portion.

12. In a snap hook, in combination, spaced side frames, a pair of members pivotally mounted between the side frames on its own individual axis and each having a curved end normally overlapping the other, a coil spring disposed transversely between the side frames and confined at its ends between said members for maintaining the members in closed relation with said curved ends overlapping, and each side frame having an extension along one side edge to form a stop for the curved end of the members opposed thereto, thus limiting movement of said member in a closing direction, each extension having a length almost equal to the length of the members having a curved end, whereby the extensions additionally cooperate with said curved ends to prevent the ring or other element held by the snap hook from becoming entangled in said curved ends during insertion or release of said ring or other element.

JOHN T. BRUEGGEMAN.